(12) United States Patent  
Eytchison et al.

(10) Patent No.: US 7,206,853 B2  
(45) Date of Patent: Apr. 17, 2007

(54) CONTENT ABSTRACTION LAYER FOR USE IN HOME NETWORK APPLICATIONS

(75) Inventors: Edward B. Eytchison, Milpitas, CA (US); Simon Gibbs, San Jose, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 732 days.

(21) Appl. No.: 10/045,213

(22) Filed: Oct. 23, 2001

(65) Prior Publication Data

US 2003/0046437 A1    Mar. 6, 2003

Related U.S. Application Data

(60) Provisional application No. 60/260,572, filed on Jan. 8, 2001, provisional application No. 60/242,807, filed on Oct. 23, 2000.

(51) Int. Cl.  
*G06F 15/16* (2006.01)

(52) U.S. Cl. .................. 709/230; 709/201; 709/202

(58) Field of Classification Search ............... 709/201, 709/249, 202  
See application file for complete search history.

(56) References Cited

U.S. PATENT DOCUMENTS

| | | | |
|---|---|---|---|
| 5,349,649 A | 9/1994 | Iijima | |
| 5,561,709 A | 10/1996 | Remillard | |
| 5,848,415 A | 12/1998 | Guck | |
| 5,886,732 A | 3/1999 | Humpleman | |
| 5,956,716 A * | 9/1999 | Kenner et al. | 707/10 |
| 6,005,861 A | 12/1999 | Humpleman | |
| 6,032,202 A | 2/2000 | Lea | |
| 6,044,407 A | 3/2000 | Jones | |
| 6,052,750 A | 4/2000 | Lea | |
| 6,085,236 A * | 7/2000 | Lea | 709/220 |
| 6,138,154 A | 10/2000 | Karino | |
| 6,154,209 A | 11/2000 | Naughton | |
| 6,160,551 A | 12/2000 | Naughton | |
| 6,167,449 A | 12/2000 | Arnold | |
| 6,173,316 B1 | 1/2001 | De Boor | |
| 6,219,839 B1 | 4/2001 | Sampsell | |
| 6,236,395 B1 | 5/2001 | Sezan | |
| 6,237,049 B1 | 5/2001 | Ludtke | |
| 6,272,127 B1 | 8/2001 | Golden | |
| 6,298,069 B1 | 10/2001 | Prabhu | |
| 6,317,781 B1 | 11/2001 | De Boor | |
| 6,324,619 B1 | 11/2001 | Raverdy | |

(Continued)

*Primary Examiner*—Rupal Dharia  
*Assistant Examiner*—Nicholas Taylor  
(74) *Attorney, Agent, or Firm*—Blakely, Sokoloff, Taylor & Zafman, LLP

(57) ABSTRACT

A network architecture for a network of electronic devices includes a device layer having a plurality of electronic devices interconnected using a network backbone, wherein the plurality of electronic devices each operate using a device native communication protocol. The architecture also includes a device abstraction layer (DAL) which communicates with each of the devices using the device native communication protocols and also presents a unified communication interface to a content abstraction program interface. The content abstraction program interface communicates with the device layer through the unified communication interface of the DAL and includes a set of content services for controlling content on the network. In one embodiment the content abstraction program interface includes a content location system (CLS), a content change notification system (CCNS), and a content engagement system (CES).

23 Claims, 12 Drawing Sheets

U.S. PATENT DOCUMENTS

| | | |
|---|---|---|
| 6,330,717 B1 | 12/2001 | Raverdy |
| 6,349,352 B1 | 2/2002 | Lea |
| 6,363,434 B1 | 3/2002 | Eytchison |
| 6,438,579 B1 * | 8/2002 | Hosken ..................... 709/203 |
| 6,438,594 B1 | 8/2002 | Bowman-Amuah |
| 6,563,769 B1 * | 5/2003 | Van Der Meulen ...... 369/30.06 |
| 6,574,655 B1 * | 6/2003 | Libert et al. ................ 709/200 |
| 6,618,764 B1 * | 9/2003 | Shteyn ...................... 709/249 |

* cited by examiner

Home Navigator App - Example

CONTENT ABSTRACTION LAYER FOR USE IN HOME NETWORK APPLICATIONS

CROSS-REFERENCE TO RELATED APPLICATION

This application claims priority of U.S. patent provisional applications No. 60/242,807, filed Oct. 23, 2000, and Ser. No. 60/260,572, filed Jan. 8, 2001, which are herein incorporated by reference in their entirety.

TECHNICAL FIELD

The invention described herein relates to networks of electronic devices. In particular, the invention pertains to a network architecture for controlling a network of audio/video electronic devices.

BACKGROUND

Recent improvements in home electronic technologies have resulted in electronic devices having significantly enhanced capabilities. Such improved electronic devices can include processing and storage capabilities. These new capabilities make possible the interconnection of many devices to form networks. One advantage of such networked devices is that they can share information and resources. As a result, applications on the networked devices can control and coordinate several devices simultaneously. Such improved electronic devices are becoming especially prevalent in the consumer electronics (CE) arena. Typical CE devices can include, but are not limited to, home audio/video (AV) devices (e.g., televisions, audio equipment, VCR's, CD (compact disk) players, DVD (digital video disk) players) or more sophisticated devices like set-top boxes (STB's, e.g., intelligent receiver/decoder IRD), and personal computers (PC's). These devices are coupled together using a network backbone such as a standard bus (e.g., a standard IEEE 1394 serial communications bus, i.e., iLink® or Firewire® buses). However, alternative buses systems can be used to form the network backbone (e.g., Ethernet (TCP/IP), Bluetooth, 802.11 as well as others).

The networked devices communicate using a number of different communication protocols. Typical protocols are defined by standards such as HAVi (Home Audio/Visual Initiative), AV/C (the AV/C Digital Interface Command Set, created by the A/V Working Group of the 1394 Trade Association, defines a protocol for monitoring and controlling CE devices), IEA 851 (EIA Standard, VHN Home Network Specification, IEA/CEA-851), OSGI (Open Service Gateway Initiative), Control A1, XML (Extended Markup Language), or UPnP (Universal Plug and Play). Such protocols will collectively be referred to as communications protocols or just protocols.

Such communications protocols are used to provide device-centric standards which solve many problems relating to device control and interoperability. Thus, as long as the devices comply with the standards, they can communicate with other networked devices which comply with the same standard. Although satisfactory for these limited, but necessary purposes, they fall short as effective content management tools on existing infrastructures.

Some of the deficiencies in existing architectures include the inability to effectively control content across networks of heterogeneous devices. For example, networks which include devices having incompatible protocols (e.g., an OSGI DVD player and a HAVi television set) can not effectively communicate or control content across the network. This is especially difficult where an application is constructed in one protocol but seeks to function on a device having another incompatible protocol.

Moreover, because devices operate in different content domains (e.g., broadcast, Internet, local audio/video (such as DVD, CD, or other formats)) format and protocol incompatibilities can exist within a network making navigation in these different domains. In addition to navigation problems, existing architectures can not effectively manage AV (audio/video) content libraries across networks of heterogeneous devices.

Among the other limitations of existing architectures is that multiple sets of controls (e.g.; remote controls) are required to control all of the networked devices, with each set of controls being dedicated to a single device. What is needed is an architecture that allows control of content on a network without having to rely on individually controlling each device on a network. In conventional infrastructures some content management services and applications can be accommodated through extensive reprogramming and translation of existing device-centric services which were never intended to accomplish such tasks. However, as a consequence such services and applications are not "portable" between protocols. Moreover, these infrastructures do not have the ability to communicate between applications as they contend for the same network assets (e.g., devices, content, services, and other resources). As a result, conflicts in the allocation of content and devices limit the usefulness of any such infrastructures.

What is needed is a network architecture that overcomes these and other difficulties. The present invention introduces method and apparatus that solves these and other issues.

SUMMARY OF THE INVENTION

The embodiments of the present invention provide architectures and methods for abstracting device layer controls into a content based set of services which integrates the functions provided by a network of consumer electronic devices. Moreover, such methods and architecture allow the seamless integration of a network of heterogeneous devices using multiple local device protocols. Such a protocol independent architecture permits the construction and use of portable applications and services for use in a heterogeneous network. Also, such architecture facilitates access and use of content located anywhere on the network. Also, the embodiments of the invention provide a uniform view of content regardless of where the specific content is stored on the network. Moreover, the embodiments of the invention do not need to change existing AV network architectures but in fact are complementary to such architectures. Also, although the embodiments of the invention provide a content-based set of services and controls which abstract the lower level device functions and controls presenting control functions only as needed by the specific applications, they also allow access to specific unique device features.

In one embodiment a network architecture for a network of electronic devices comprises a device layer including at least one electronic device interconnected to at least one network backbone, wherein each electronic device operates using a device native communication protocol, a content abstraction program interface in communication with the at least one device of the device layer, the content abstraction program interface abstracting lower level device functions of the at least one electronic device and providing the at least one device with a set of content services which control the content accessible to the at least one electronic device.

In another embodiment a network architecture comprises a device layer including, at least one electronic device programmed to communicate using a device native communication protocol, at least one network backbone, each electronic device connected to one of the at least one network backbone, a device abstraction layer connected to the device layer, the device abstraction layer enabling communication between the at least one device and the device abstraction layer using the device native communication protocol of the at least one electronic device, the device abstraction layer further enabling communication between the device abstraction layer and a higher network layer in a manner independent of device native communication protocols.

In yet another embodiment a network architecture includes a device layer having a plurality of electronic devices interconnected using a network backbone, wherein the plurality of electronic devices each operate using a device native communication protocol. The embodiment also includes a device abstraction layer (DAL) which can communicate with the plurality of devices regardless of the device native communication protocol used by any of the plurality of devices and which presents a unified communication interface to a content abstraction program interface (CAPI), wherein the CAPI communicates with the device layer through the unified communication interface of the DAL and wherein the content abstraction program interface abstracts low level device control functions of the plurality of devices into a set of content services which control the content accessible to the plurality of interconnected electronic devices.

In another network architecture embodiment the CAPI includes a content location system (CLS) for locating content accessible to the plurality of interconnected electronic devices. The CAPI also includes a content change notification system (CCNS) which tracks changes in content and content related information and notifies client applications which are registered with the CCNS of the changes in content and content related information. The CAPI also includes a content engagement system (CES) which engages content accessible to the plurality of interconnected electronic devices in conjunction with location information provided by the CLS.

In another embodiment, a method for providing content services and abstracting lower level device functions in a network of at least one electronic device is disclosed. The method comprising presenting a list of applicable content services, accessing a list of content services, selecting a content service, initiating a content service request, interpreting the content service request, determining which of the content services and which of the at least one device is appropriate to receive the interpreted request, communicating the interpreted request to the appropriate at least one device and to the appropriate content service, and executing the service request.

Other aspects and advantages of the invention will become apparent from the following detailed description taken in conjunction with the accompanying drawings which illustrate, by way of example, the principles of the invention.

Reference numbers refer to the same or equivalent parts of the embodiments of the invention throughout the several Figures of the drawings.

DETAILED DESCRIPTION OF THE DRAWINGS

Figure 1:
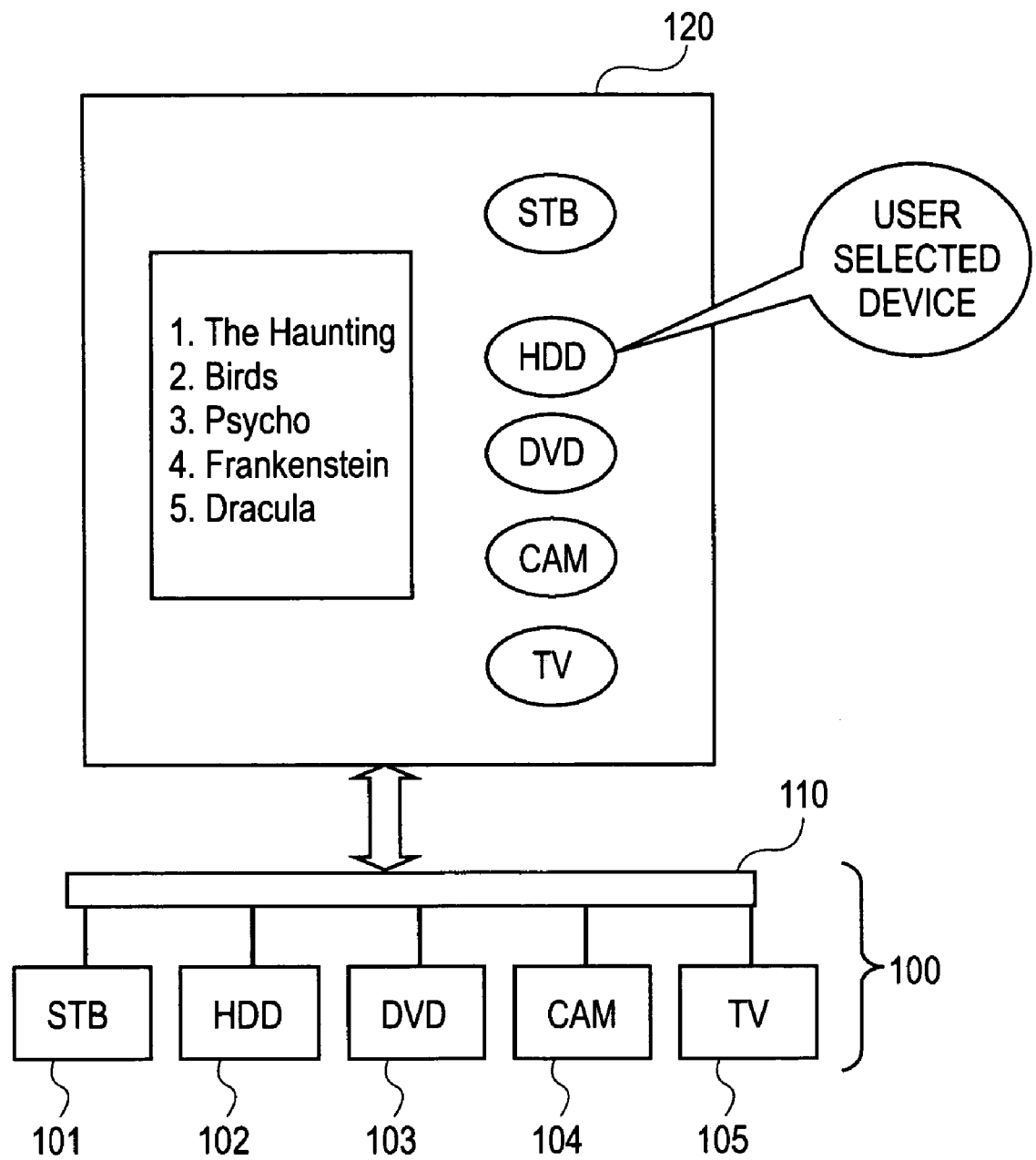
FIG. 1 is a block diagram of a conventional device-centric CE (consumer electronic) network architecture where user selects a device to access its content and controls.

One embodiment of a conventional device-centric architecture and system is described with reference to FIG. 1. FIG. 1 is a block diagram of a network embodiment 100 having a plurality of CE devices 101, 102, 103, 104, 105 interconnected by a network backbone 110 to form a network 100. The network 100 includes a set-top box (STB) 101, a computer including a hard disk drive (HDD) 102, a DVD player 103, a camcorder 104, and a television (TV) 105. In the depicted embodiment 100 the backbone 110 comprises an IEEE 1394 serial bus (hereinafter a 1394 network). As previously discussed, alternative buses systems can be used form the network backbone. A display interface 120 is also depicted (example display interfaces can include, a CRT of a computer system or a television set, LCD displays, projection displays, as well as other display devices known in the art). The display interface 120 shows a GUI (graphical user interface) used in the device-centric approach. On the right-hand side of the display 120 is a menu showing all devices connected to the network 100. Each device is individually selected to access device controls and to locate, access, or engage content using that device. This is what is meant by device-centric architecture.

Here, the disk drive 102 is selected and a list of movies available on the disk drive 102 is shown on the left-hand side of the display 120.

The present invention will be particularly shown and described with respect to certain preferred embodiments and specific features thereof. The embodiments set forth herein below are to be taken as illustrative rather than limiting. It should be readily apparent to those of ordinary skill in the art that various changes and modifications in form and detail may be made without departing from the spirit and scope of the invention.

The embodiments of the present invention include content management tools that enable the management of content and content-related information across a network of electronic devices. Content, as generally defined, is information presentable for interesting and useful access; such as data, written documents, audio, video, or other multimedia data. Such content-related information includes, but is not limited to, content metadata and content attributes. Content attribute information describes the properties of the content and can generally be thought of as physical and technical properties of the content. Examples of typical content attributes include information such as, system configuration settings, file sizes, file locations, content ownership information as well as access rights, content timing information, or other technical properties. Content metadata is descriptive information concerning the content. For example, if the content is a movie, metadata can include a plot summary, list of actors, "liner notes", URL's for further information, etc.

Figure 2:
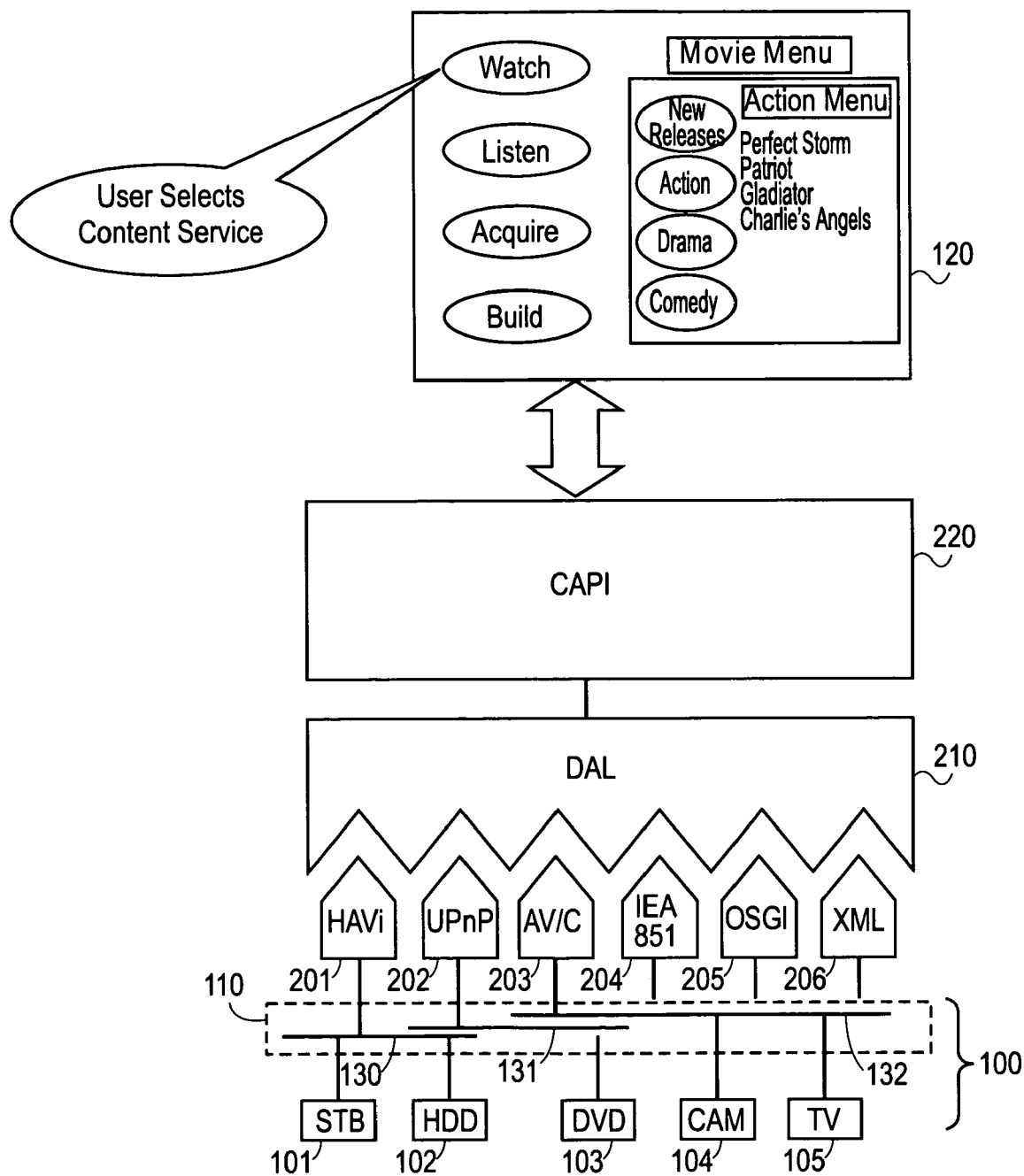
FIG. 2 is a block diagram of a CE network architecture embodiment in accordance with the principles of the present invention

FIG. 2 is a block diagram of content-centric architecture in accordance with the principles of the present invention. Content-centric architectures are, in this context, architectures wherein the user does not specifically access a device to retrieve content information, but rather seeks to access specific content (e.g., music, movies or games) regardless of device type or content location. FIG. 2 shows a network embodiment 100 having a plurality of CE devices 101, 102, 103, 104, 105. The devices are connected to network elements (shown here as elements 130–132) which enable device communication using an appropriate protocol, for example, STB 101 communicates with HDD 102 using network element 130 using a HAVi protocol. Other compatible devices and networks are interconnected. The group of network elements (here 130–132) are collectively referred to as the network backbone 110. The CE devices 101, 102, 103, 104, 105 are interconnected to the network backbone 110 to form the network 100. As with FIG. 1, the network 100 includes a set-top box (STB) 101, a computer including a hard disk drive (HDD) 102, a DVD player 103, a camcorder 104, and a TV 105. Moreover, as with FIG. 1, the backbone 110 of the depicted embodiment 100 can include an IEEE 1394 serial buses (hereinafter a 1394 network) such an iLink® manufactured by Sony Corporation of Japan (Tokyo, Japan). Alternatively, the backbone 110 can include, but is not limited to, Ethernet, Bluetooth, 802.11 or other network backbones. Each of the devices 101–105 communicates across the network 100 using its own native communication protocols. Such protocols include, but not limited to, HAVi, UPnP, AV/C, IEA 851, OSGI, and XML. The devices 101–105 communicate with an abstraction layer (shown here comprising the DAL 210 and a content abstraction program interface 220). In this embodiment, the devices 101–105 communicate with the DAL 210 using their own native communication protocols via proxies which are represented by blocks 201–206. The DAL 210 includes an API set which includes network specific protocols and API's enabling the DAL 210 to communicate with all the devices of the network 200 regardless of device protocol. The DAL 210 also includes a unified communication interface enabling the DAL 210 to communicate with higher level network layers. In the depicted embodiment, the unified communication interface enables the DAL 210 to communicate with a higher level network comprising a content abstraction program interface (CAPI) 220. Thus, the DAL 210 communicates with each networked device 101–105 in its own native communication protocol and presents a unified communication interface to the CAPI 220 such that the CAPI 220 can communicate with the DAL 210 using a single protocol. The DAL 210 serves as an interface between the many networked devices 101–105 and the CAPI 220. Both the DAL 210 and the CAPI 220 will be described in greater detail in the following paragraphs.

FIG. 2 shows a GUI 120 of a content-centric network which may be displayed on a variety of display devices including but not limited to, a computer display device, a television set, or a personal digital assistant (PDA). The GUI 120 shows a typical display screen showing an example of a content-centric approach. On the left-hand side of the display is a menu showing content services available from the networked devices. As can be seen, all devices and device controls are absent from the display. This is to be contrasted to the device-centric approach demonstrated in FIG. 1. Instead of displaying devices, the depicted embodiment displays content services. Four such services are shown (e.g., Watch, Listen, Acquire, and Build). The inventors contemplate a wide range of other services including, but not limited to, Buy, Favorites, and Play.

A brief description of typical service embodiments follows. The Watch service is intended to view network accessible content. For example, photos, movies, television programs, home movies, and the like. Such content can be accessed through the local network via video tapes, DVD's, minidisks (MD), content stored on a hard drive, Internet viewable content, and many other content sources. The Listen service functions much like the Watch service, only the content is audio in nature, for example, music. Such content can be accessed through the local network via content stored on a hard drive, radio, audio tapes, CD's, Internet accessible audio, and many other content sources. The Acquire service can permit acquisition of content from a remote (e.g., the internet) or a pay source to add to local devices. The Build service permits the construction of customized content from content available to the user. For example, home movie content can be edited and sound added to create a customized movie or digital photographs can be collected together in a single file to create a digital "photo album". A Buy service can be used to purchase item. In one implementation, the Buy service can be used with the Acquire service to buy, for example, a pay-per-view content service. The Favorite service permits a user to compile and use a list of favorite content from among the content available through the network. The Play service accesses games available on the network. For example, computer games stored on a computer hard drive, Internet games, games available on a networked game play device like a Sony PlayStation® or PlayStation 2®, and the like.

In the embodiments of the present invention, each device is seamlessly abstracted into an overall content-centric architecture. This allows presents an interface to a user where only the needed information is presented. For example, if a user has activated a movie on a DVD player and streamed that movie to a television, the appropriate DVD controls (e.g., pause, play, etc.) and the appropriate TV controls (e.g., volume, mute, brightness, etc.) can be displayed. No lower level device functions are visible until such functions are needed by the user. As a result, only the relevant content service and relevant device controls are displayed. For example, the content service "WATCH" is selected and a movie menu appears on the right-hand side of the GUI 120. The movie menu presents a list of movies available for viewing on all networked devices without reference to which device the movie will be streamed from. As also shown, the movie menu can be arranged to, for example, categorize content. The depicted embodiment shows movie categories such as new releases, action movies, dramas, and comedies, with each category containing a list of movies applicable to that category. Of course, the categories can be defined in many other ways, even adding device specific categories like "home movies" which could be accessed, for example, through a camcorder 104. The user never sees the device level information, it is abstracted by the CAPI 220. However, once an element of content is selected, relevant device level controls can be displayed. For example, if a movie stored on a DVD player is selected, relevant controls (e.g., play, pause, forward, etc.) can be displayed.

Figure 3:
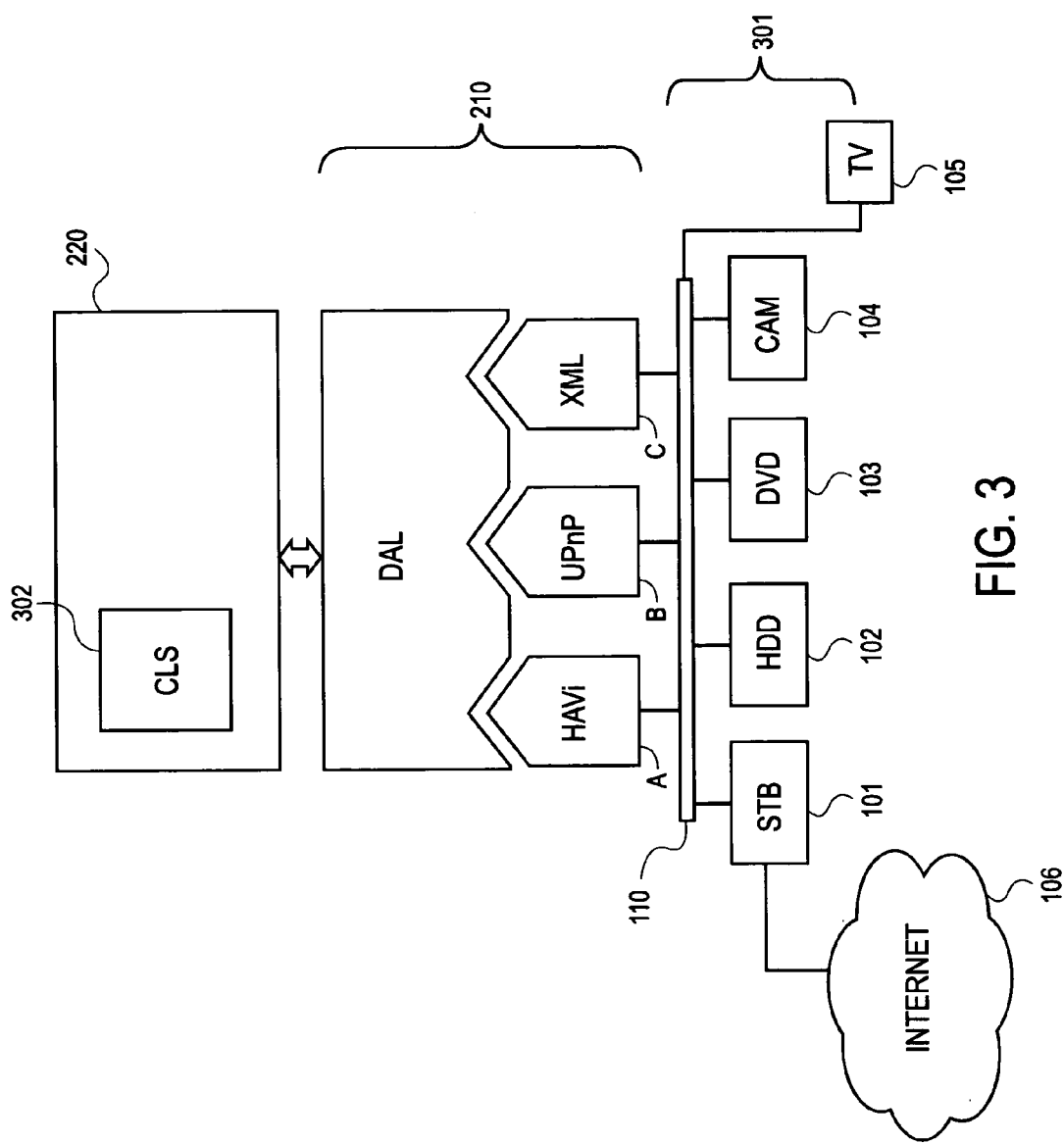
FIG. 3 is a block diagram of a CE network architecture embodiment where a Content Abstraction Program Interface (CAPI) includes a Content Location System (CLS) in accordance with the principles of the present invention.

An implementation of the overall content-centric architecture is depicted in FIG. 3. The architecture includes a device layer 301 (comprising the CE devices 101, 102, 103, 104, 105 the network backbone 110, communication protocols, communication proxies A, B, C), the DAL 210, and a CAPI 220 which includes a CLS 302 (Content Location System, described in detail below). Also, the architecture can be connected to an outside network such as the Internet 106 (e.g., using a STB 101 or computer system 102). Communication between the CE devices 101, 102, 103, 104, 105 and the DAL 210 is achieved through the communication protocols via proxies A, B, C. As explained above, the devices communicate with the network and each other using a variety of protocols (i.e., HAVi, UPnP, XML, or others). The Device Abstraction Layer (DAL) 210 encapsulates a variety of device and network protocols which enable the DAL 210 to communicate with any device on the network regardless of the device communication protocol. The DAL 210 isolates services contained in the Content Abstraction Program Interface (CAPI) 220 from the various CE architectures and protocols. Thus, the DAL 210 provides a platform which can communicate between the architectures and protocols existing in the device layer 301, and also offers a unified interface to communicate with the CAPI 220. By doing so, the DAL 210 eliminates the CAPI's dependence on the specific communication protocols of the device layer 301. As a result, CAPI services are independent of the underlying communication protocols of the device layer 301 and present a unified interface to the CAPI services. Consequently, CAPI services and applications are completely portable without regard for the underlying architectures and communication protocols of the device layer 301. Thus, CAPI services and applications operate just as well on HAVi compliant architectures as with, for example, UPnP compliant architectures. In other words, CAPI services can operate on heterogeneous networks. For example, networks having both HAVi compliant devices and UPnP compliant devices.

Among the many CAPI services is the CLS 302 which provides information enabling applications to specifically locate content on the network. As a result the CLS 302 allows access to specific content (e.g., movies or even a specific movie) which exists on a network of devices without a user needing to specifically access a device to retrieve content information. Thus, the depicted embodiment can locate a movie across the array of heterogeneous devices which make up the network. CLS 302 also provides services for acquiring attribute and metadata information which is associated with content. Moreover, CLS 302 enables services for creating AV content. CLS 302 also permits the generation and maintenance of "use profiles". The CLS 302 also enables other content services (e.g., search, modification, etc.).

Figure 4A:
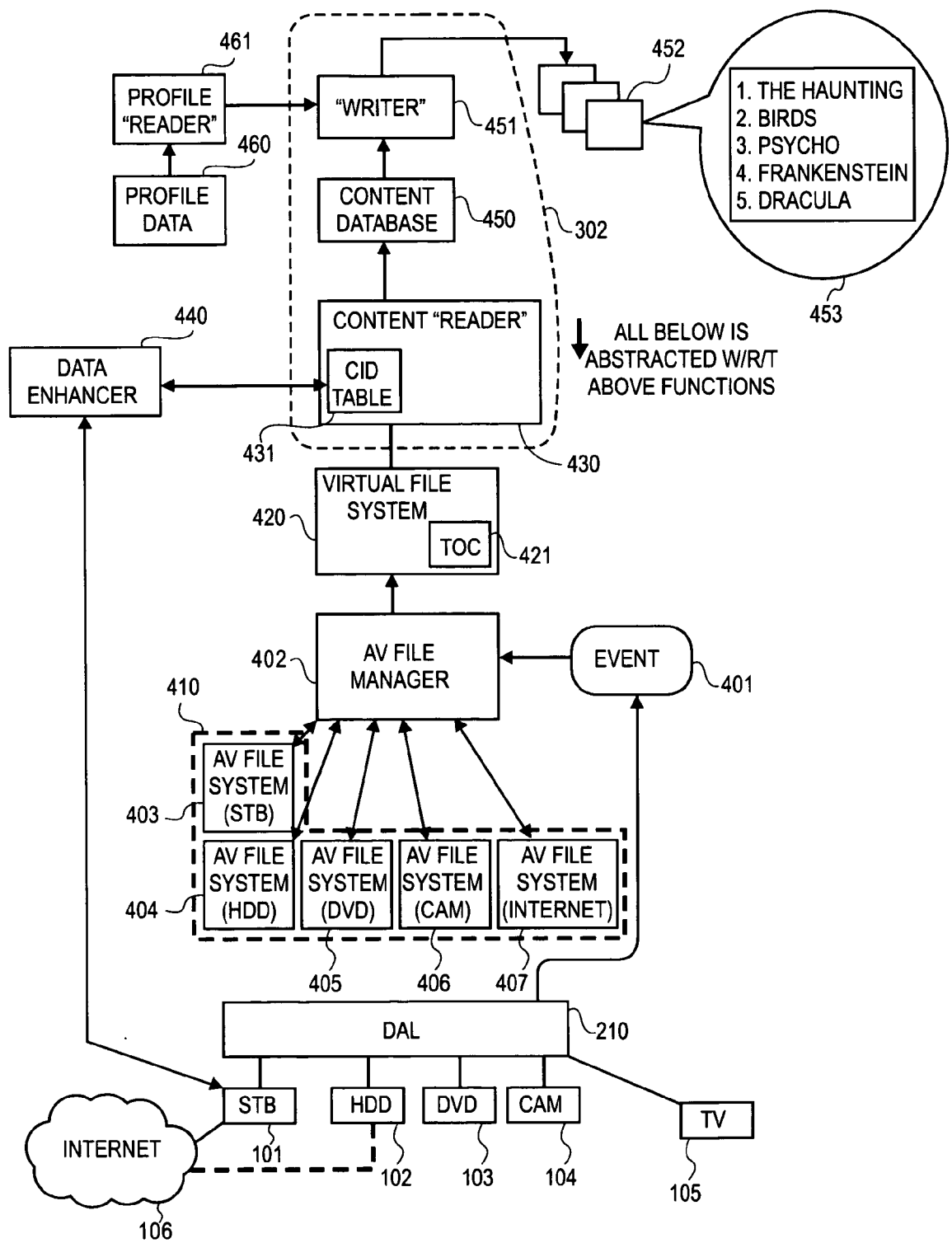
FIG. 4(a) is a more detailed illustration of a CLS embodiment in accordance with the principles of the present invention.
Figure 4B:
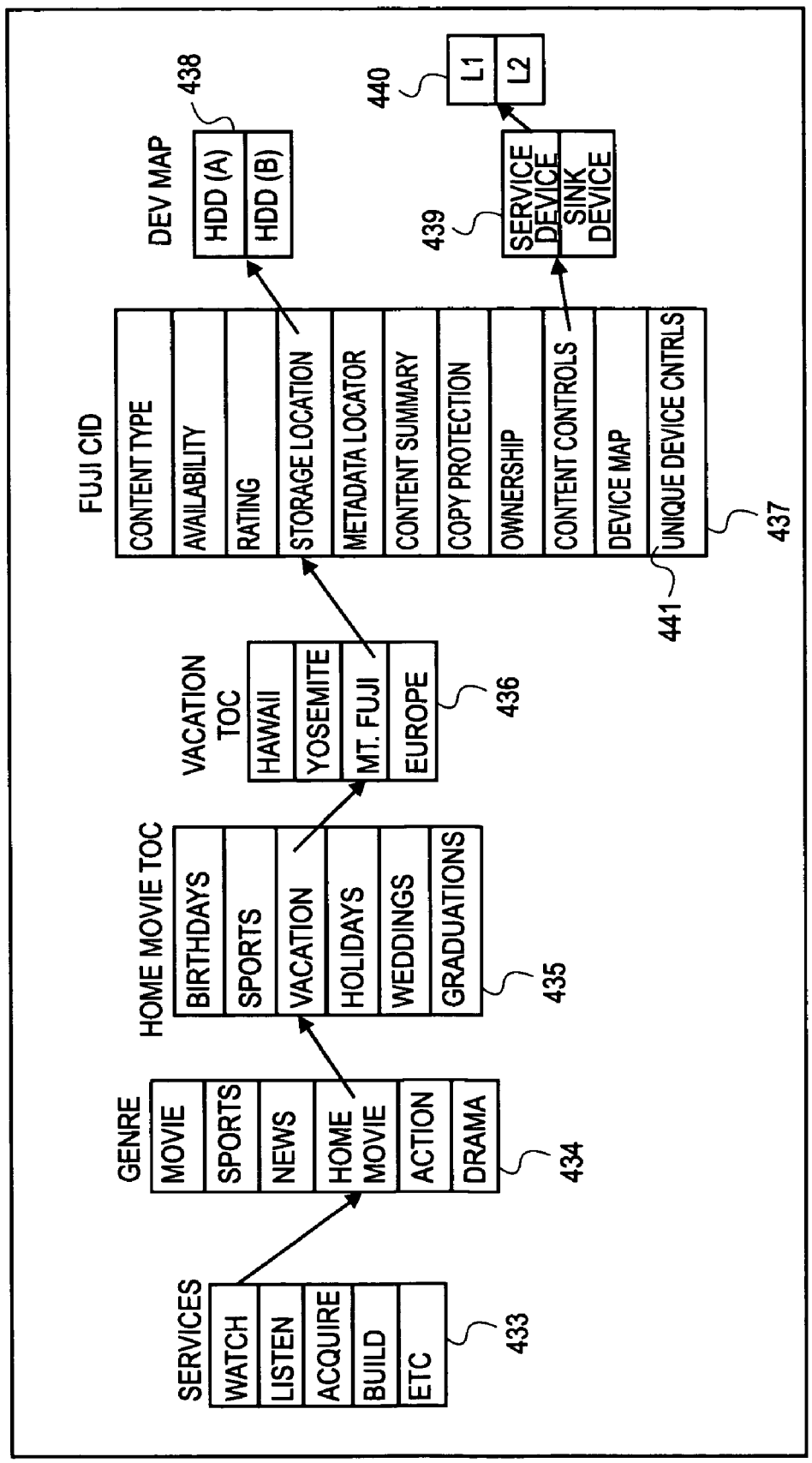
FIG. 4(b) is an illustration of a Content Information ID Structure embodiment in accordance with the principles of the present invention.

FIG. 4(*a*) illustrates the implementation of one embodiment of a CAPI 220. A plurality of devices, e.g., 101, 102, 103, 104, and 105 are connected to a DAL 210 through a network layer as in FIGS. 2 and 3. Example devices shown here are a STB 101, a hard disk drive 102, a DVD player 103, a camcorder (CAM) 104, and a TV 105. The invention can be practiced using different or other devices. FIG. 4(*a*) depicts, in particular, the CLS 302 aspect of the CAPI 220.

The operation and components of the CLS 302 are explained with reference to FIG. 4(*a*). The CLS 302 operates in response to "events" and user requests. "Events", generally, are changes in content or content related information (i.e., attributes, metadata, etc.). Typical events include, but are not limited to, pausing content during operation, rewind, fast forward, play. Other events include, adding, removing, or modifying content or content related information such as metadata or attribute information. Also, adding or removing devices from the network comprises an event. Events may also include the addition, modification, deletion, or discontinuation of Internet accessible content. Moreover, events can include the addition, modification, deletion, or discontinuation of subscriber accessible content including, but not limited to cable or satellite television or "radio". These examples are rather specific events which serve as basis for CLS activity. In addition to local events, event information provided from outside the local network can be accommodated by the CLS. Processing of local and non-local events is facilitated, in part, by an AV (audio/video) File Manager 402 which comprises part of the CLS 302.

In general, the File Manager 402 creates and maintains file systems for tracking and controlling content, receives event information from the network, and generates and updates tables of content information. The function of a File Manager 402 embodiment will be illustrated with reference to an example "event" (e.g., a new hardware device is connected to the network, such as a DVD player 103 being connected to the network). The act of connecting the DVD player 103 to the network alerts the DAL 210 to the presence of the DVD player 103. The DAL 210 provides event information 401 that notifies the AV File Manager 402 that a new device has been connected to the network. Upon connection, the DAL 210 informs the AV File Manager 402 of any content present on or accessible to the newly connected device. Continuing the example of the DVD player 103, the DAL 210 notifies the AV File Manager 402 of any DVD content resident on the DVD player 103. This notification can proceed through a variety of means, including direct notification of the AV File Manager 402 by the DAL 210 or through a Content Change Notification System (CCNS) which will be discussed in greater detail hereinbelow.

In response to an event (here, the addition of a new device, the DVD), the AV File Manager 402 creates a file system (e.g., 405) which contains information concerning the indicated source (e.g., a device or an internet content source). For example, AV file system 405 is created for the DVD player 103. Similarly, AV file systems are created for the STB 403, the hard disk drive 404, the camcorder 406, and to the extent applicable, the TV (file system not shown). Also, an internet file system 407 can be created containing internet content listings accessible to the network. AV file systems can be created for all real or virtual content interacting with the network. Typical information contained in such AV file systems can include content services, content categories, content tables of content, content attribute information, content metadata information, also device functions and characteristics can be included in such file systems. If the physical (or virtual) device contains a file system, the file manager simply maps its file system so it can reference it. Also, existing AV file systems are continually updated as the AV File Manager 402 receives updating event information 401. The AV file systems are collected in a Content Repository 410.

The AV File Manager 402 sends the same information as in the Content Repository 410 to a Virtual File System (VFS) 420. The VFS 420 compiles all the information into a Table of Content (TOC) 421, which lists all content or references within the local network (e.g., 100 of FIG. 2). Typical examples are content stored on a HDD, DVD's residing on a DVD player, CD's residing on a CD player, and the like. The TOC 421 also contains content listings accessed through broadband devices, such as Internet content accessed through networked systems like a computer or STB. Also, content accessed through cable or satellite access devices like radio or television can be listed. This can include "pay-per-view" content.

The CLS includes a Content "Reader" 430. The Content "Reader" reads the TOC 421 information from the VFS 420 and creates a Content ID Table 431 (CID). The CID Table 431 includes, for each piece of content, a file having information which includes the name of the content, where the content is located (i.e., on DVD player 103), the content attributes, and content metadata. Specific data, which is preferably incorporated into a CID Table 431, includes type of content, content availability, content rating, a content metadata locator, a content summary, content copy protection status and ownership rights, content and device controls, and a device map. For example, the movie "GODZILLA" may be represented in the CID Table 431 by content data objects with properties (classes) for location, engagement, attributes, and so on (e.g. Godzilla.owner="family room dvd"; Godzilla.mode=play; Godzilla.time=2 hrs.; 10 mins., and other related properties).

CAPI needs a certain amount of content related information to operate. At a minimum, CAPI needs content type (e.g., audio, video, and other content formats), content title, specific content identification (CID), and category information (e.g., genre). However, if the device is unable to provide this minimum information, the Content "Reader" 430 may access a Data Enhancer 440 which can access supplementary sources of content information. For example, the Content "Reader" 430 will provide the Data Enhancer 440 with the content data it has available. The Data Enhancer 440 will assess this information, determine which data is missing. Based on the available information, the Data Enhancer 440 will access alternative sources of content data information. For example, the Data Enhancer 440 can access websites known to have supplementary content information (i.e.: CDDB, Free DB, etc.). The Data Enhancer 440 accomplishes this via an internet connection. In the depicted embodiment, the internet is accessed using the set top box, (STB, DSL, Cable Modem, etc.) 101 which accesses and queries various websites on the Internet 106. Once the appropriate information is located, accessed and downloaded, the Data Enhancer 440 adds this information to the CID Table 431. Also, the Data Enhancer 440 may be able to obtain the desired information from other devices connected to the network, e.g., a hard disk drive 102. In short, Data Enhancer 440 determines whether the CID Table 431 information is complete for each piece of content, if not, the Data Enhancer 440 uses the existing information to retrieve supplementary information from any of the available sources, retrieves that data and enters the data into the CID Table 431.

The illustration in FIG. 4(*b*) shows some of the structure and features of a CID Table 431. For example, the CID Table 431 includes a list of services 433 available to CAPI. As shown, the "Watch" service is selected which reveals a topic (by genre) category table 434 that includes a list (table) of content categories. The "Home Movies" category is selected revealing a table 435 of home movies available to the network. If "Vacations" is selected from the Home Movie category table 435, a table 436 of vacation home movies is accessed. Table 436 includes categories for specific vacation home movies. If, for example, Mt. Fuji is selected, the Mt. Fuji Content Identifier (CID) is accessed. The CID 437 contains a list content information concerning that exact piece of content. In one embodiment information accessible through the CID includes, but is not limited to, Content Type, Content Availability, ATSC rating, content storage location, Metadata Locator, content summary, copy protection status, Ownership status, Content Controls, Device Maps, and Unique Device Controls.

Still referring to FIG. 4(*b*), once content is selected, a Device Map 438 is accessed showing all the storage locations for the selected content. If, for example, Content Controls was accessed, source and sink (or target) devices can be displayed 439. If, for example, a Source device is selected, a Unique Functions menu 440 can be displayed. For example, L1 allows access to functions standard to all devices of a class (e.g., for a VCR, "play", "pause", "fast forward", "stop", "rewind", etc.), whereas L2 allows access to level 2 functions, which comprise the distinctive features unique to a given manufacturer's devices. Such access to unique features may also be accessed for any device on the network using a Unique Device Controls category 441.

Returning again to FIG. 4(*a*), information from the augmented CID Table 431 is stored in a content database 450. A writer 451 reads the stored information from the content database 450 and writes the virtual file information to at least one cached page 452. It is these cached pages 452 which may be accessed and called up by applications. For example, an application might be used to call up and review a list of "Horror" movies. In response, a cached page which lists Horror movies will be displayed. Such a page is depicted in the blown up view of a cached page 453. The page can be displayed on any display device connected to the network. Examples include TV screens, CRT's, PDA display panels, etc. Moreover, such an application can be called up using a remote control or other device configured to access the pages.

In addition to the foregoing features, the CLS can also include a profile "reader" 461. The profile "reader" 461 obtains information from various sources, for example, a profile database 460 or other source of profile information. Such profile information generally concerns network user usage patterns. Such profile information can consist of an intelligently constructed history of previous user behavior concerning content access. Such data can be collected over time and categorized in accordance with processes inherent to the profile "reader" 461, which will then store the data in a profile database 460. Thus, when the user wishes to access content, for example, early on Saturday morning, the profile "reader" 461 will access the profile database 460 and determine that on previous Saturday mornings the watchers of content typically watched cartoons. As such, information concerning the available cartoons can be displayed as one of the cached pages 452. Moreover, the profile parameters can be user determined. For example, a user could block access to certain content which he/she does not wish the children to watch. Moreover, for users having very large content libraries the profiler can be used to pair down the viewable portion of the users library. For example, an application might call up and review a list of "Horror" movies. The user may have 1,000 "Horror" titles available for viewing. Review of each title can be extremely burdensome. However, the Profiler in conjunction with past behavior can provide an abbreviated list directed toward more preferred titles. In response, the cached page will display the more preferred list of Horror movies.

Another advantageous feature of the depicted embodiment is the abstraction level possible. All of the features and functions below line 470 are abstracted with respect to the higher level functions. Thus, the minutia of content management is not viewed by the user or the applications which generate the cached pages 452. Another extremely advantageous feature of the embodiment of FIG. 4(a) is that each of the independent software processes (operating structures) used to enable system operation can be distributed anywhere on the network. For purposes of this patent, such operating structures can include each of the boxes of FIG. 4(a). For example, the AV File Manager 402, the VFS 420, the Profile "Reader" 461, the "Writer" 451, and the cached pages 452 can all be located on a remote server. And the Content "Reader" 430 and Data Enhancer 440 can be located on a local server. Also, the Content Repository 410, Content Database 450, Profile Database 460 can be located on a centralized server. This example configuration is intended to illustrate the possibilities and is by no means to be construed to limit the possible distribution of the operating structures across the networked devices. The possible distributions are only limited by the limitations and capabilities of the network, the networked devices, the Internet, networked intranets, or any other entities connected to the network.

Figure 5:
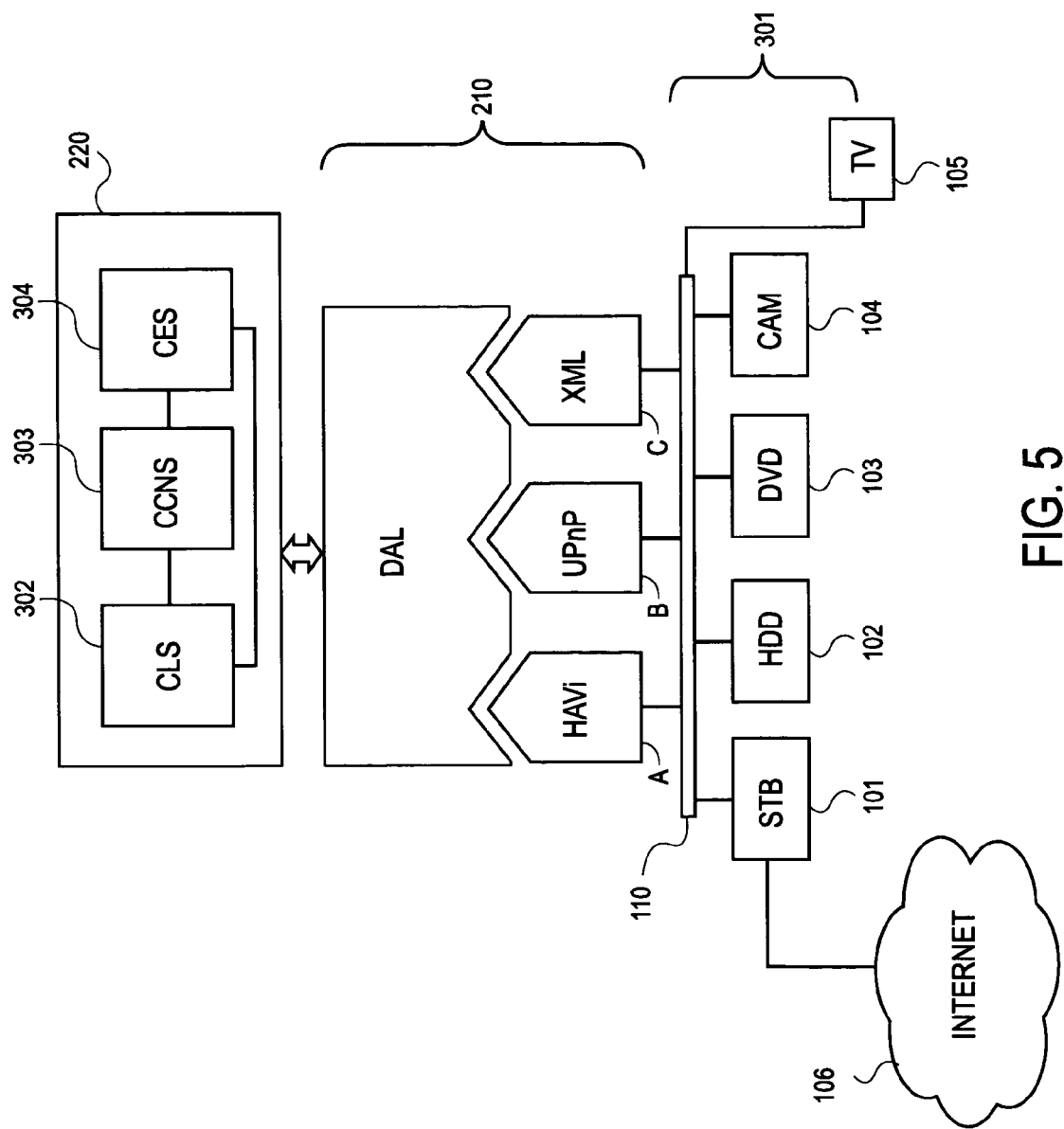
FIG. 5 is a block diagram of a CE network architecture embodiment where the CAPI includes a CLS, a Content Change Notification System (CCNS), and a Content Engagement System (CES) operating in accordance with the principles of the present invention.

FIG. 5 shows an embodiment having enhanced CAPI services. In addition to the CLS 302 discussed earlier, the depicted CAPI 220 embodiment includes a Content Change Notification System (CCNS) 303 and a Content Engagement System (CES) 304. The CCNS 303 and the CES 304 are in communication with the CLS 302 and with each other, thereby enabling the CAPI 220 to provide enhanced services. The combination of applications 302, 303, and 304 provide a powerful integrated suite of content services. As with the previously depicted embodiments, the depicted embodiment includes a device layer 301 having, for example, STB 101, HDD 102, DVD player 103, a CAM 104, and television (TV) 105.

Figure 6:
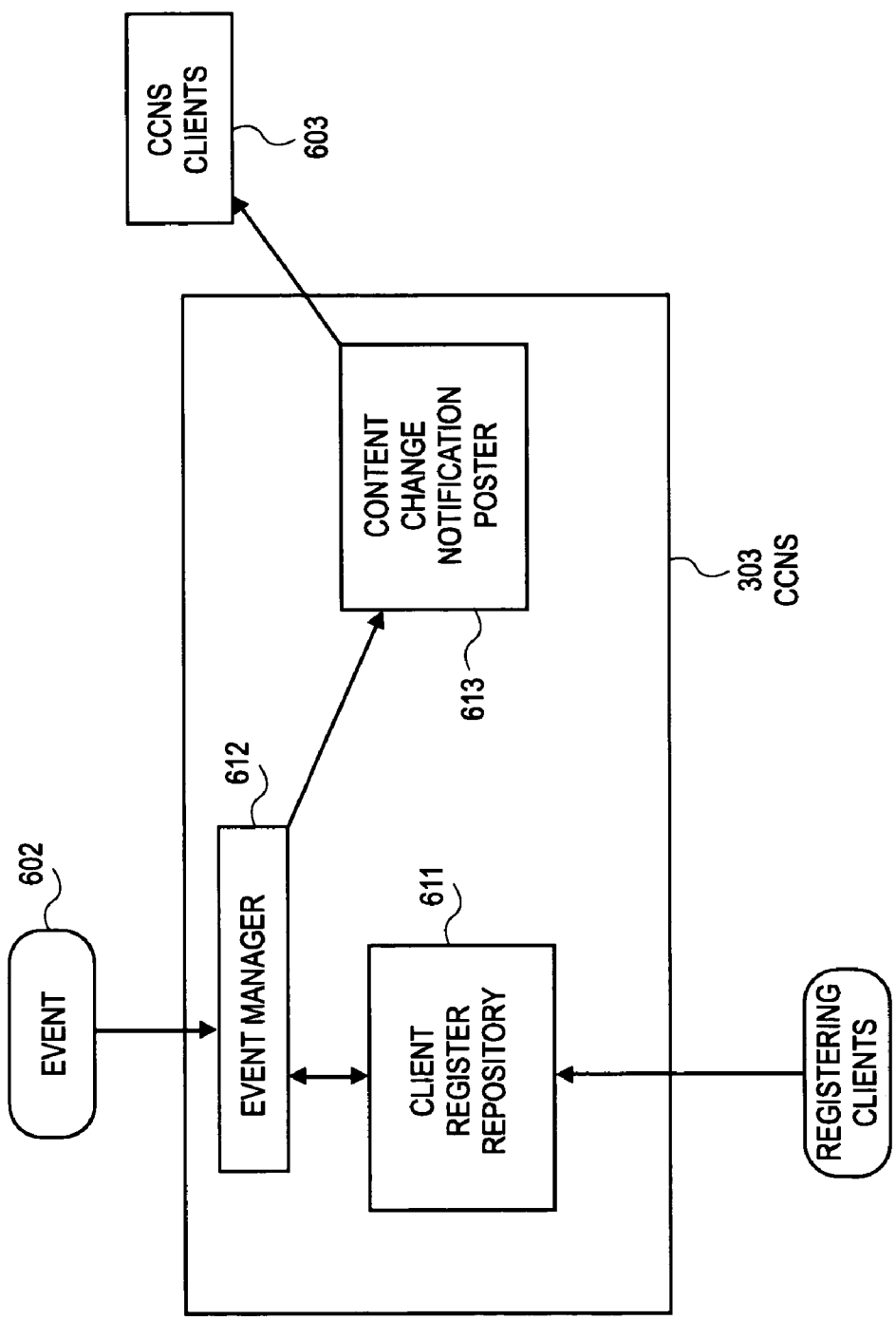
FIG. 6 is an illustration of a CCNS embodiment in accordance with the principles of the present invention.

The CCNS 303 detects, tracks, and reports "events" to registered clients. For purposes of this patent, registered clients are defined as any process wishing to post event information or any process wishing to receive event information. Registered clients can include, without limitation, the CES. The CLS applications can register with the CCNS, or a control element such as a PDA. FIGS. 5 and 6 illustrate various aspects of the CCNS 303. The CCNS 303 is responsible for sending messages (e.g., asynchronous messages) to registered clients anytime information concerning the content changes (including changes to attributes and metadata). Applications and CAPI services register 601 with the CCNS 303 as subscriber clients to receive content change information. Registered clients are entered into a Client Register Repository 611. Typically, the repository 611 includes a registration database for storing client registration information. Once registered with the CCNS 303, the clients are continually supplied with content change information. Event information 602 is provided to the Event Manager 612 of the CCNS. Events that result in CCNS notifications can include, content detection, modification, removal, change in content status, and content or device consumption (explained hereinbelow). Once event information is received by the Event Manager 612, the Client Repository 611 is accessed to determine which clients will be notified of the Event. Once the clients to be notified 603 are determined, the Event Manager 612 sends event information to a Content Change Notification Poster 613, which sends asynchronous event information to the registered clients 603. Returning to FIG. 4(a), one implementation of the CCNS 303 is to provide event information 401 to the AV File Manager 402 of the CLS. In other words, the CLS registers with the CCNS as a CCNS client 603. As with the CLS, the functions of the CCNS can be distributed throughout the network.

In a typical example, if a DVD is removed from a networked DVD player 103, the content contained on that DVD is no longer accessible to the network. Thus, the Event Manager 612 of the CCNS 303 will receive an event message and, as a result, registered clients of the CCNS 303 will receive information concerning the changes in AV content related to removal of the DVD from the DVD player 103. For example, the CLS 302 receives this information from the Poster 613 and updates the file systems to reflect the removal of that content from the system. Additionally, content events that occur at locations remote from the network can also be monitored. For example, if an AV system has access to content on a website, through an internet connection, changes in internet content can be monitored by the DAL 210 which reports changes in content to the CCNS 303, which sends notification to registered clients 603. The poster 613 of the CCNS 303 notifies registered clients that a change in content has occurred.

In AV systems, there are so-called source devices and sink devices. A source device is a device capable of "streaming" or sending content to another device. For example, STB's, DVD players, VCR's, CD players, or computer disk drives or digital cameras, camcorders or other like devices. The source devices deliver content (e.g., a movie) to sink devices. A sink device (also known as a target device) is capable of receiving the streamed content. Source devices can store or display the streamed content. Such devices include, but are not limited to, TV's, computer CRT's, computer disk drives, or even a digital cameras, camcorders or other like devices. When content is delivered by a streaming device to a sink device both devices are said to be "consumed", as is the specific content being "engaged". The CCNS 303 is notified of this "consumption" and in turn notifies the appropriate CCNS clients. This prevents, for example, two streaming devices from using the same sink device at the same time.

Another advantageous feature of the CAPI 220 shown in FIG. 5 is the CES 304. The CES 304 tracks and controls the "engagement" process of content by manipulating devices. The CES 304 "engages" content by altering its mode of operation (for example changing a movie in a DVD player from "play" status to "pause" or any other mode of operation). The CES 304 also permits the engagement of content through the use of triggers (e.g., engage a selected movie a specific time) which can be preset by the user. The CES 304 also supplies content consumption information which can be used to generate content profiles. Moreover, the CES 304 can be used to maintain a dynamic activity map of content and devices such that the status of each device and piece of content in the network is kept track of. For example, if a STB 101 is accessing a "pay-per-view" movie from the Internet 106 and streaming it to a TV 105 from 8:00 p.m. to 10:00 p.m., the CES 304 will track the engagement status of the content and devices and write this information to the activity map. As a consequence, other applications and services seeking to use the TV 105 as a sink device at 9:15 p.m. will know from consulting the continuously updated activity map that the TV 105 has been "consumed". Additionally, unique device features are accessed through the CES.

The CES 304 is responsible for controlling the streaming of content from source to sink devices. The CES does this in a content-centric manner. For example, if an application wishes to stream content from a broadband source (e.g., from the Internet 106 through STB 101) to a local storage device (e.g., a HDD 102), the application merely references the content title from the CLS 302 and engages the CES 304 to route the content to the target device. From a user's perspective, this is done without reference to the source device, the sink device, or other system configuration information.

Figure 7:
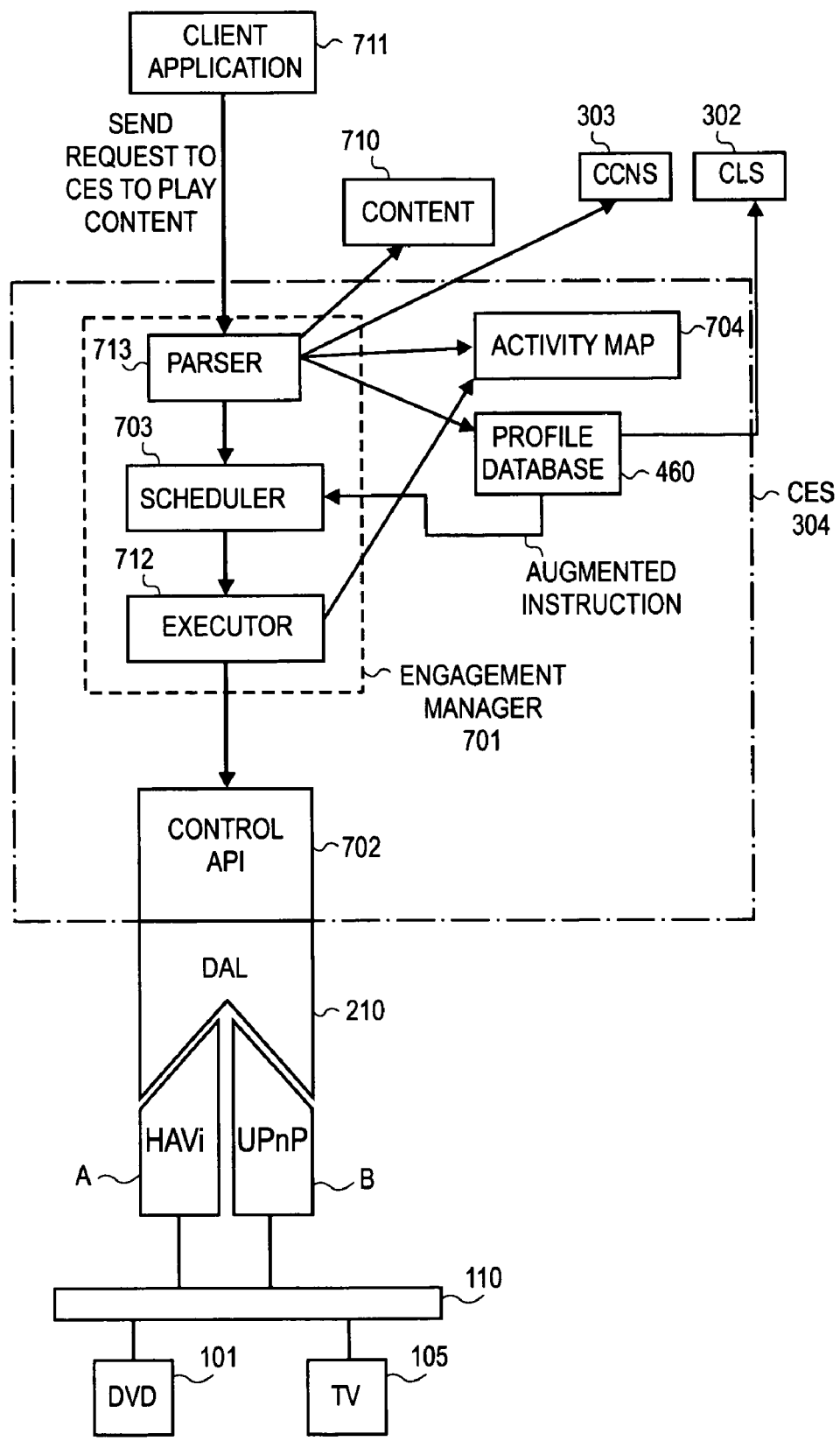
FIG. 7 is a more detailed block diagram of a CES embodiment in accordance with the principles of the present invention.

FIG. 7 illustrates a simplified AV network embodiment that includes a CES 304. A pair of AV devices (DVD player 101 and TV 105) connected to a network backbone 110. For purposes of illustration, the DVD player 101 is HAVi compliant and the TV 105 is UPnP compliant. As such the two sets of control proxies A, B are interfaced with the DAL 210 which presents a unified interface to CAPI and in particular, the CES 304. The DAL 210 communicates with the CAPI (in particular the CES 304) via a unified control API 702 which is in communication with an Engagement Manager 701. The CES 304 includes a Dynamic Activity Map 704 for monitoring device activity across the network. In other words, the Dynamic Activity Map 704 tracks the device usage across the network in order to prevent two devices from being activated at the same time. The Engagement Manager 701 accesses the Dynamic Activity Map 704 to prevent device conflicts, like trying to stream content from two different sources into a single television. The CES 304 can also incorporate the Profile Database 460. The Engagement Manager 701 includes a Parser 713, a Scheduler 703, and an Executor 712 which, in combination, manage, control, and execute device and content use. As with the CLS and CCNS the operating structures defined by the boxes of the CES can be distributed throughout the network.

For example, if a user wishes to view news programs on his/her television at 6:00 p.m., the user inputs this information into CAPI and this information is stored by the Scheduler 703. Moreover, the Scheduler 703 also notifies the Executor 712 of the Engagement Manager 701 when scheduled content is to be engaged.

A typical example of operation of the CES 304 is where a Client 711 calls for a change in content object 710 status. Where the Client 711 calls for content engagement (e.g., playing a movie) it is the Engagement Manager 701 that implements that instruction. The Client 711 Requests that a content object 710 (e.g., a movie) be played. This Request (depicted by the arrow between 711 and 713) is in the form of an engagement instruction sent from the client application 711 to the CES 304. In particular, the Request is sent to the Engagement Manager 701. The Parser 713 receives the Request and parses out the relevant information. In the process the Parser 713 makes the Request readable and forwards the readable instructions to the Executor 712 which forwards the instructions to appropriate devices and applications. Additionally, the Parser 713 forwards the request information to the Profile Database 460. This information can be used by the CLS 302 to map user content consumption preferences, which can then be written to cached pages for user access.

Additionally, the Parser 713 checks the Scheduler 703 for device and content scheduling conflicts, then consults the Device Activity Map 704 to determine if the effected devices are already in use. If there are no conflicts the Parser 713 instructs the Executor 712 to have the source device 101 stream the content 710 (e.g., a movie) to an available sink device 105. In the depicted embodiment a movie is streamed from the DVD player 101 to TV 105 for display. In addition, the engagement of the selected content object 710 is posted to the CCNS 303 wherein registered clients can be asynchronously notified of the change in engagement status of the effected content object (here, a DVD movie). The Device Activity Map 704 is also updated to reflect the fact that the source device 101 and sink device 105 are in use. Also, the Parser 713 can receive augmented instructions from the profile database 460. The Profile Database 460 can for example, inform the Scheduler 703 that other instruction concerning content must be executed. For example, in addition to playing a movie at 10:00 p.m. the scheduler contains an instruction to record the movie at 10:00 p.m. This execution instruction is forwarded to the Executor 712 for execution by the system.

Numerous applications for the previously discussed architectures are possible. One implementation is a network navigator application. Such a navigator is simple to use, provides access to all content accessible through network devices, conveniently categorizes content, and eliminates the need for multiple remote controls.

Figure 8A:
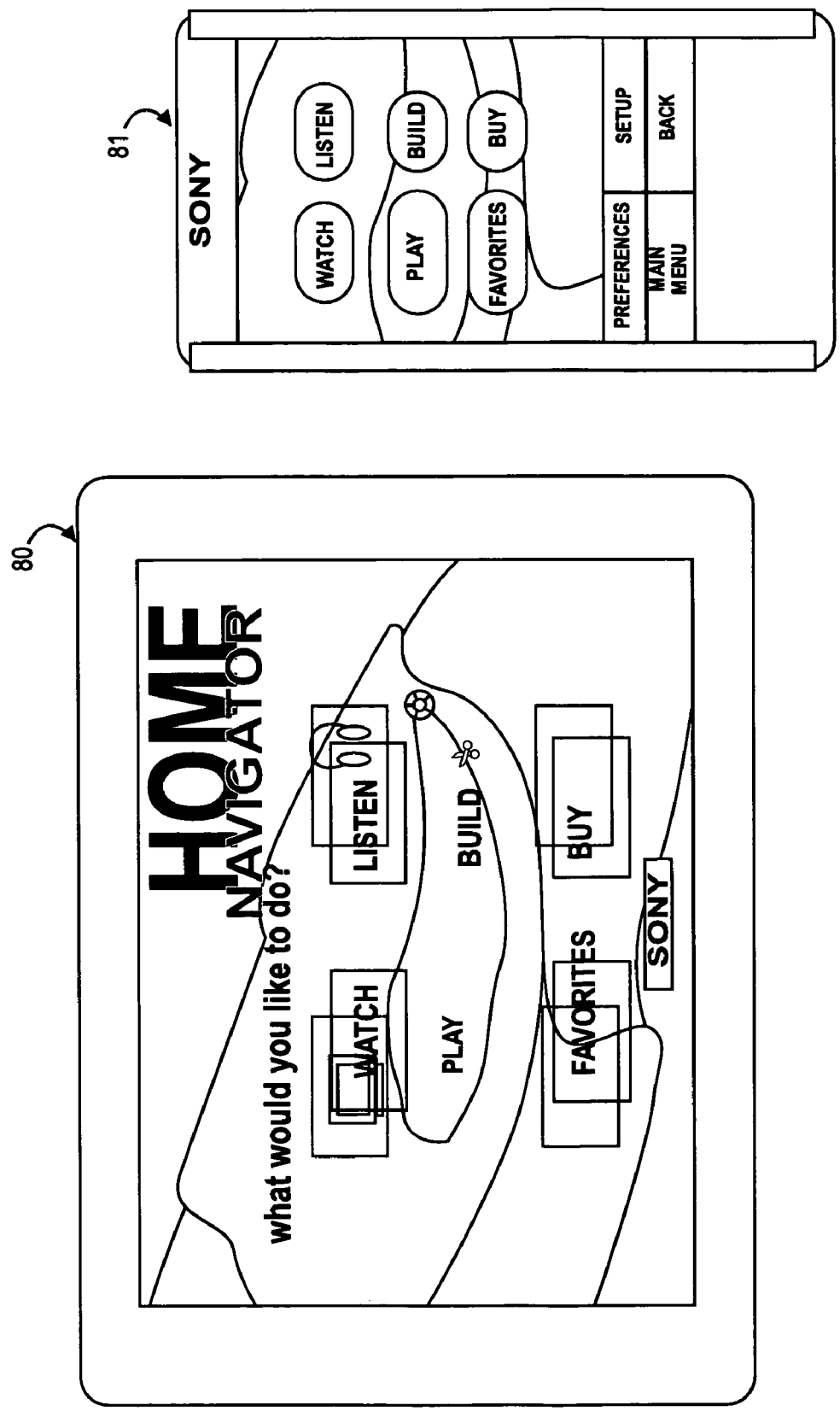
FIG. 8A depicts a screenshot on a TV screen and on a PDA screen, showing an initial menu viewed in a Navigator application embodiment in accordance with the principles of the present invention.

FIG. 8A shows a screen display of an initial navigator interface. The display is depicted on a television screen 80 and, for comparison, a PDA display panel 81. Example applications are depicted. The depicted applications include, but are not limited to, "Watch", "Listen", "Play", "Build", "Favorites", and "Buy". The Watch application allows the user to watch video content accessible to the network (e.g., movies, television shows, and other video content). The Listen application allows the user to listen to audio content accessible to the network (e.g., radio, cable radio, internet radio, CD's, and other audio content). The Play application is used to access game content accessible to the network (e.g., video games, computer games, Internet games, and other game related content). The Build application allows the user to collect assorted content from many sources and integrate that content into a custom application (e.g., a custom "slide shown", a customized music play list, or any combinations of content accessible to the network). The Favorites application allows the user to access, assemble, and use a customized content list (ostensibly comprised of user "favorites") accessible to the network (e.g., movies, music, or other user defined content). The Buy application allows the user to buy items or services to the extent such is available to the network accessible to the network (e.g., buy things over the Internet, access and buy theater or concert tickets, buy "pay-per-view" events).

Figure 8B:
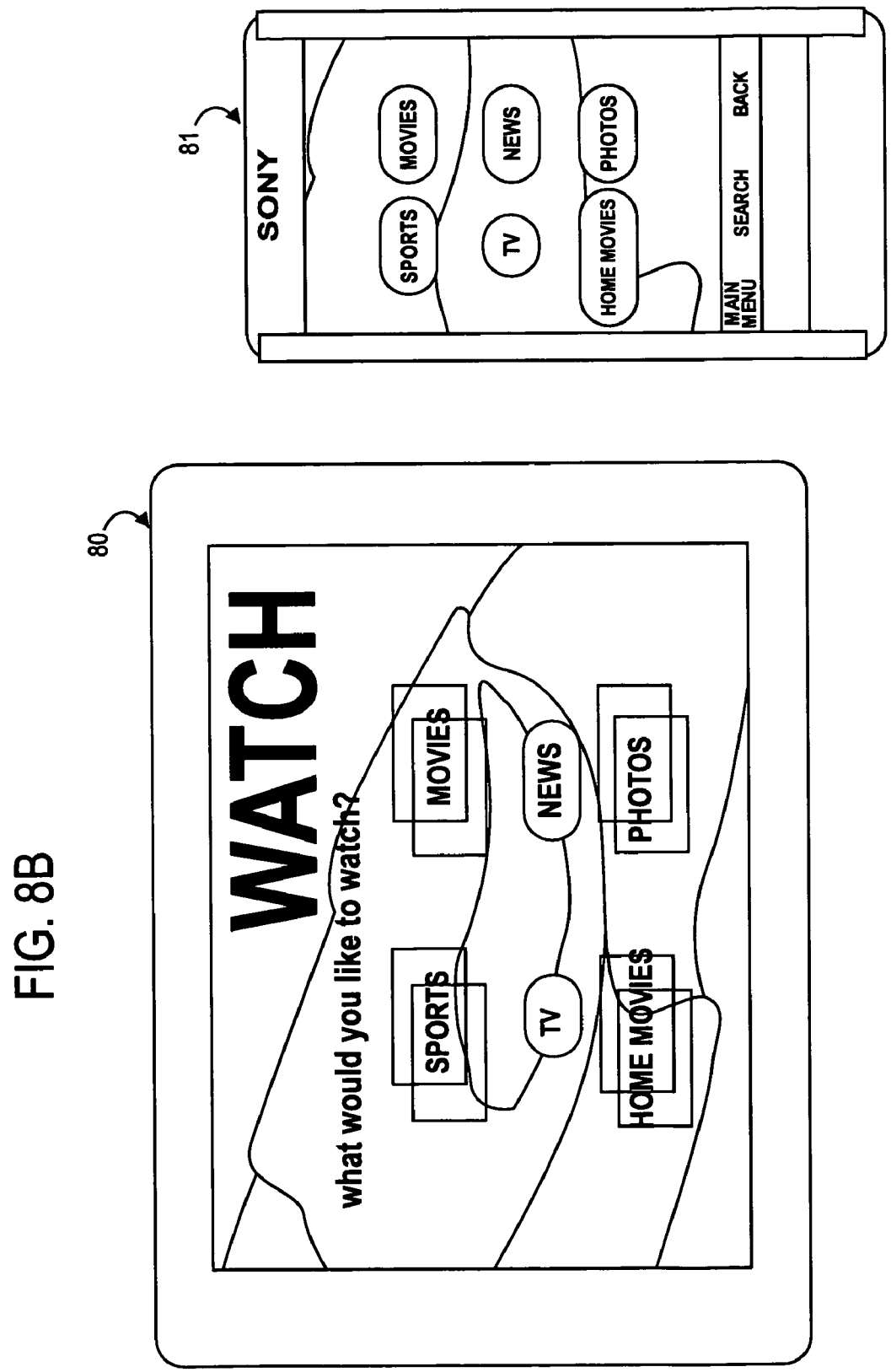
FIG. 8B depicts a screenshot on a TV screen and on a PDA screen, showing a Watch menu selected from the menu of FIG. 8A in the Navigator application embodiment in accordance with the principles of the present invention.
Figure 8C:
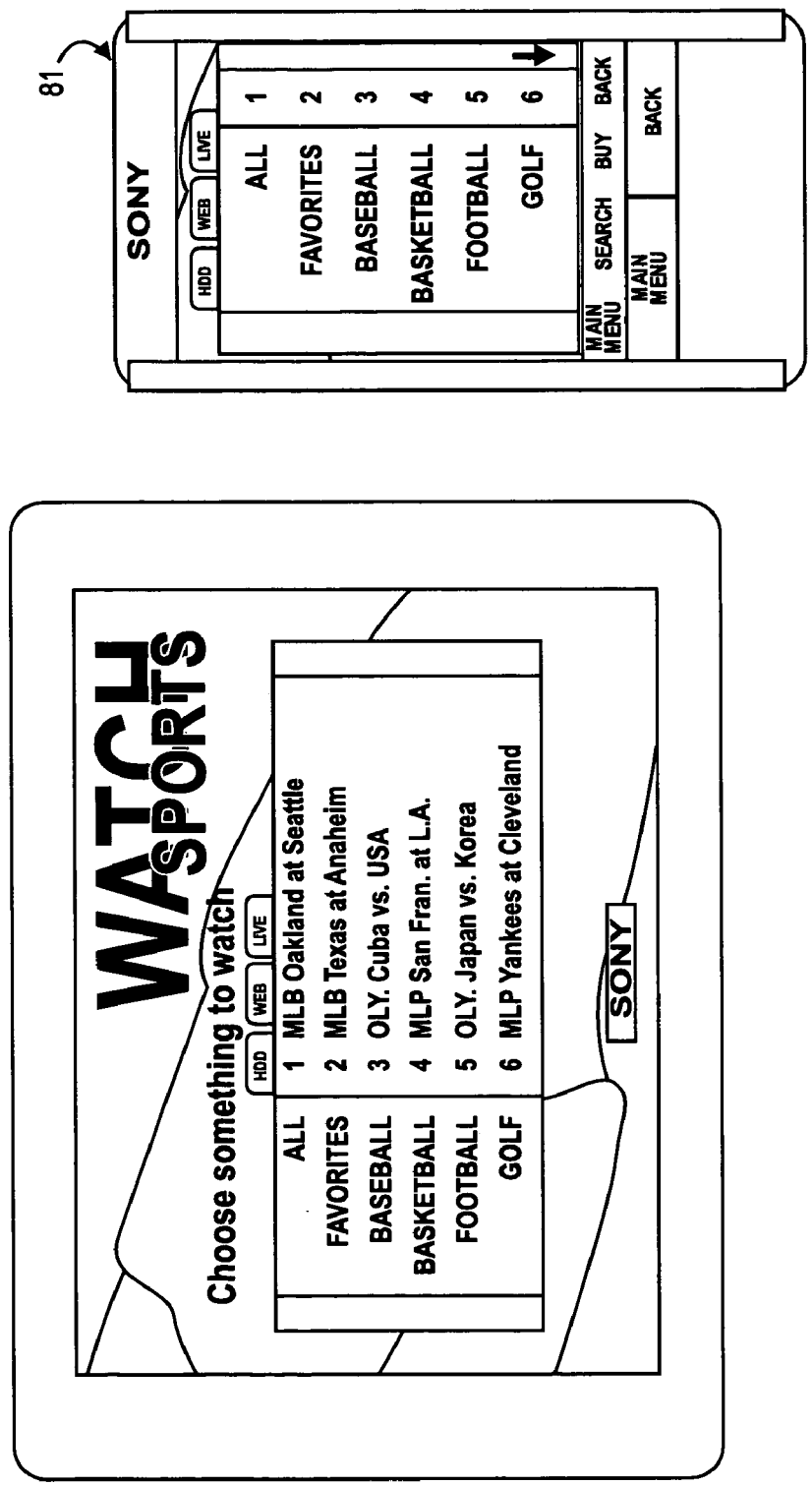
FIG. 8C depicts a screenshot on a TV screen and on a PDA screen, showing a Sports menu selected from the menu options of FIG. 8B in the Navigator application embodiment in accordance with the principles of the present invention.

Once an application is selected a new display screen is displayed. FIG. 8B shows a screen for the Watch application. The Watch application displays a plurality of watchable content categories. Again, the display is depicted on a television screen 80 and a PDA display panel 81. Example content categories are displayed. The depicted embodiment includes categories for "Sports", "Movies", "TV", "News", "Home Movies", and "Photos". Selecting a category activates a category menu screen display. For example, in FIG. 8C a "Sports" screen display is depicted. Again, the display is depicted on a television screen 80 and a PDA display panel 81. Lists of available sports are baseball, basketball, football and golf. "All" is another heading which lists all of the available sporting events. "Favorites" highlights specified favorite sporting events identified by the user. It should be noted that, due to its smaller screen size, the PDA 81 typically has a more abbreviated menu than the television screen 80. Specific events can be accessed by pressing the highlighted events. Here, the user has selected baseball. A list of baseball games is displayed. By selecting the arrow, the user may scroll down the list to access other sporting events which are not depicted on the screen. It should be noted that there are subcategories of sporting events. These subcategories define certain attributes of the sporting events. For example, live sporting events may be accessed by tabbing the "Live" tab. Sporting events which are being accessed through the Internet can be viewed and accessed by using the "Web" tab. Furthermore, sporting events accessible through the hard disk drive can be accessed through the "HDD" tab. As will be apparent to those having ordinary skill in the art, many other applications can be created and used with the architecture disclosed herein.

Figure 9:
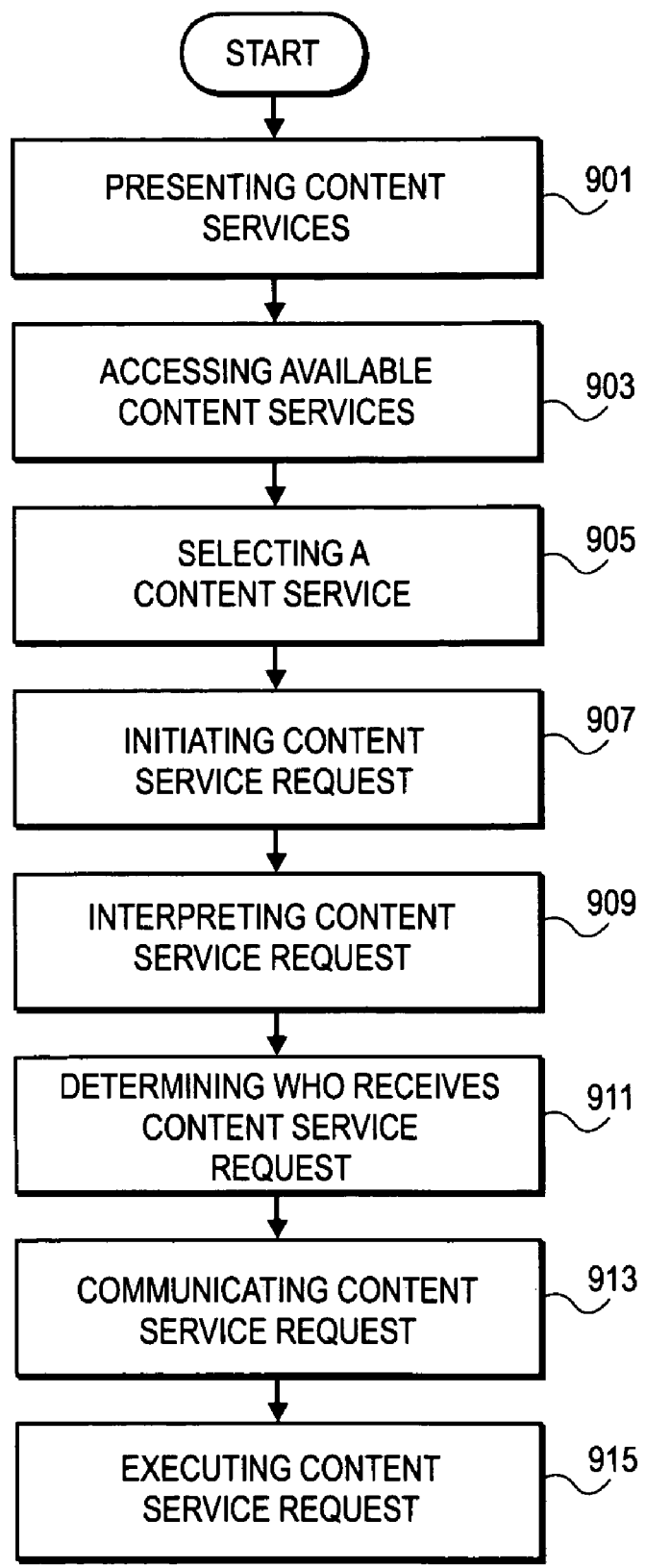
FIG. 9 is a flow diagram for a method embodiment implementing aspects of the present invention.

One method embodiment for implementing aspects of the invention is described with respect to the flow diagram of FIG. 9. A list of applicable content services is presented to the user 901. Additionally, content information is gathered by locating content and content related information on the network. A suitable format for displaying lists of this kind is shown, for example, in FIGS. 8A–8C. The lists can include, without limitation, system services (e.g., watch, listen, play, etc.) content categories, other content related information, and device controls. In short, content and content related information is located on the network and displayed in a manner which abstracts low level device functions and displays content services. Also, the lists can be constantly updated and modified as discussed, for example, in FIG. 4(*a*). As can be appreciated by those having ordinary skill in the art, other ways of altering the structure and content of the lists can be used. Different lists can be accessed in order to view the desired services 903. Items from accessed list of content services can then be selected 905.

A request for content service can be initiated 907. The following example makes reference to 8C wherein a user has selected "MLB Oakland at Seattle" from the list 80 of FIG. 8C. By selecting "MLB Oakland at Seattle" a content service request is initiated. This can be implemented, for example, in the manner described in FIG. 7. The application (Here, "Watch" "Sports") sends a request to the CES 304 where the Engagement Manager 701 (in particular, the Parser 713) receives the content service request. The Parser 713 interprets the request by translating the request into a readable format which the elements of the system can understand 909. The Parser 713 also determines which of content services and which of the networked devices are appropriate to receive the interpreted request 911. The CES 304 completes its system operations and communicates the service request as needed to the other operating structures of the system, to the registered clients and to the Executor 712 of the Engagement Manager 712. The Executor 712 communicates the service request to the applicable devices. In this example, the service request "Watch" "MLB Oakland at Seattle", is communicated as instructions to, for example a source device (here, HDD) to a sink device (e.g., a television). Subsequently, the service request can be executed 915.

In the above example, the "MLB Oakland at Seattle" is streamed from the HDD to the television for viewing. Also, once the devices are engaged, only relevant controls and content services are presented to the user. In this example, relevant device controls pertaining to the HDD include controls like play, pause, rewind, etc. Whereas, relevant device controls pertaining to the television include controls like volume, brightness, tint, etc. In an ordinary system, several remote controls would be required to control and activated the required devices. In this embodiment of the invention, all the controls can be concentrated on a single display.

The present invention has been particularly shown and described with respect to certain preferred embodiments and specific features thereof. However, it should be readily apparent to those of ordinary skill in the art that various changes and modifications in form and detail may be made without departing from the spirit and scope of the invention as set forth in the appended claims. Further, reference in the claims to an element in the singular is not intended to mean "one and only one" unless explicitly stated, but rather, "one or more". Furthermore, the examples provided herein are intended to be illustrative rather than limiting. The inventions illustratively disclosed herein can be practiced without any element which is not specifically disclosed herein.

We claim:

1. A network architecture comprising:
   a device layer including,
      at least one electronic device programmed to communicate using a device native communication protocol,
      at least one network backbone,
      each electronic device connected to one of the at least one network backbone; and
   a device abstraction layer connected to the device layer, the device abstraction layer enabling communication between the at least one device and the device abstraction layer using the device native communication protocol of the at least one electronic device, the device abstraction layer further enabling communication between the device abstraction layer and a content abstraction program interface in a manner independent of device native communication protocols, wherein the content abstraction program interface includes a content change notification system that notifies client applications of changes in content and content related information and the device abstraction layer includes a set of proxies, each proxy enabling communication between the at least one device and the device abstraction layer using a device native communication protocol, and a unified communication interface for communicating between the device abstraction layer and a higher network layer in a manner independent of device native communication protocols.

2. A network architecture for a network of electronic devices comprising:
   a device layer having a plurality of electronic devices interconnected using at least one network backbone, wherein the plurality of electronic devices each operate using a device native communication protocol;
   content accessible to the plurality of electronic devices;
   a content abstraction program interface which includes a set of content services for controlling the content accessible to the plurality of interconnected electronic devices and a content change notification system which notifies client applications of changes in content and content related information;

a device abstraction layer which can communicate with the plurality of devices regardless of the device native communication protocol used by any of the plurality of devices and which presents a unified communication interface to the content abstraction program interface, wherein the device abstraction layer includes a set of proxies for communicating with the devices of the device layer; and the content abstraction program interface communicates with the device layer through the unified communication interface of the device abstraction layer such that the content abstraction program interface abstracts low level device control functions of the plurality of devices into the set of content services which control the content accessible to the plurality of interconnected electronic devices.

3. The network architecture of claim 2 wherein the content abstraction program interface includes a content location system for locating content accessible to the plurality of interconnected electronic devices.

4. The network architecture of claim 3 wherein the content location system includes:

a file manager which receives event information concerning content and content related information, a content repository having a plurality of content file systems, wherein the file manager creates and maintains the content file systems, a virtual file system, wherein the file manager forwards information from the content repository to the virtual file system which creates and maintains a table of content which includes updated content and content related information, a content reader, wherein the content reader reads the content and content related information from the virtual file system into a content identification table wherein each piece of content and content related information is associated with a unique content identifier and stored as a unique content entry in the content identification table, a content database, wherein the content reader also reads each unique content entry in the content identification table into the content database, and a writer for writing selected unique content entries into cached pages which can be accessed by applications using the architecture.

5. The network architecture of claim 4 wherein event information, concerning content and content related information, received by the file manager, is provided to the file manager by a content change notification system.

6. The network architecture of claim 4 wherein the content location system further includes a data enhancer which analyzes each unique content entry the content identification table to determine its completeness, and wherein the data enhancer supplements each incomplete unique content entry with supplementary content and content related information.

7. The network architecture of claim 6 wherein the data enhancer supplements the incomplete unique content entries with supplementary content and content related information retrieved through Internet sources.

8. The network architecture of claim 4, wherein the content location system further includes a profile database which includes information concerning network user content use patterns and preferences and includes a profile reader which reads the information from the profile database into the writer which writes the profile information into cached pages which can be accessed by applications using the architecture.

9. The network architecture of claim 8 wherein the profile database is updated with content usage information provided by a content engagement system.

10. The network architecture of claim 2 wherein the content change notification system tracks the changes in content and content related information.

11. The network architecture of claim 10 wherein the content change notification system includes, a client register repository for registering client services and client applications and storing such registration information in a registration database, an event manager for receiving event information and communicating with the client register repository and using the registration information in the registration database to determine which registered client services and client applications are registered to receive the event information, a content change notification poster, and wherein the event manager communicates with the content change notification poster instructing the content change notification poster to post the event information to registered client services and client applications which have been determined by the event manager to be registered to receive the event information.

12. The network architecture of claim 10 wherein the content location system is registered with the content change notification system as a client application and wherein the content change notification system notifies the content location system of the changes in content and content related information.

13. The network architecture of claim 12 wherein the content abstraction program interface further includes a content engagement system which enables the engagement of content regardless of its location on the network and wherein the CES notifies the content change notification system of changes in content engagement status.

14. The network architecture of claim 10 wherein the content abstraction program interface further includes a content engagement system which engages content accessible to the plurality of interconnected electronic devices in conjunction with location information provided by the content location system.

15. The network architecture of claim 14 wherein the content engagement system further includes:

an activity map;

a control application interface;

an engagement manager having a parser, a scheduler, and an executor;

the engagement manager communicates with the activity map to determine the current engagement status of the content and the plurality of interconnected electronic devices;

the parser receives and interprets instructions to engage content and distributes the instructions for further action;

the scheduler determines the status of preset engagement instructions and provides instructions based on the preset engagement instructions; and the executor, in response to instructions from the scheduler and parser, communicates the instructions to the device layer where selected source and sink devices are engaged such that the content is streamed from the source device to the sink device.

16. The network architecture of claim 15 wherein the content engagement system further includes a profile database which is in communication with the engagement manager such that changes in device and content engagement status become part of the profile database, and wherein the profile database communicates with the content location system to generate content profiles.

17. The network architecture of claim 15 wherein the engagement instructions received by the engagement manager are communicated by the scheduler in response to preset engagement instructions received by the scheduler.

18. The network architecture of claim 14 wherein the content engagement system includes, in combination, an
engagement manager, an activity map, a profile interface, and a control application interface, wherein the content engagement system receives instructions to engage content and in response communicates with the device abstraction layer to engage the content, and
wherein the content engagement system communicates with the content change notification system to report the change in content engagement status.

19. A network architecture comprising:
a first network device that communicates using a first protocol, wherein the first network device communicates via a network backbone and via a first proxy with a device abstraction layer; and
a second network device that communicates using a second protocol, wherein the second network device communicates via the network backbone and via a second proxy with the device abstraction layer;
wherein the device abstraction layer communicates via a unified communication interface with a content abstraction program interface such that the device abstraction layer and the content abstraction program interface communicate using a single protocol;
wherein the content abstraction program interface communicates with a display device; and
wherein the display device outputs a graphical interface that comprises a list of content services, wherein the content services are associated with content stored on the first and the second network devices, and wherein in response to the graphical interface receiving a command selecting a particular content service the graphical interface comprises a list associated with content that is associated with the selected content service.

20. The architecture of claim 19, wherein the content abstraction program interface comprises a content location system that enables an application to locate content stored in one of the network devices.

21. The architecture of claim 19, wherein the content abstraction program interface comprises a content change notification system that detects and reports a change to content, or to information associated with content, stored in one of the network devices.

22. The architecture of claim 19, wherein the content abstraction program interface comprises a content engagement system that enables control of the movement of content stored in one of the network devices to a sink device.

23. The architecture of claim 19,
wherein the network backbone comprises a first network element associated with the first protocol and a second network element associated with the second protocol,
wherein the first network device communicates via the first network element, and
wherein the second network device communicates via the second network element.

* * * * *